F. BURNEY.

Manufacture of Gunpowder.

No. 5,773 Reissued Feb. 24, 1874.

Witnesses.
J. L. Coombs
T. M. Coombs

Inventor.
Frederick Burney,
By S. S. Coombs, Atty.

A.M. PHOTO-LITHOGRAPHIC Co. N.Y. (OSBORNE'S PROCESS.)

UNITED STATES PATENT OFFICE.

FREDERICK BURNEY, OF FAVERSHAM, GREAT BRITAIN, ASSIGNOR TO THOMAS S. POPE AND WILLIAM S. COLVIN.

IMPROVEMENT IN THE MANUFACTURE OF GUNPOWDER.

Specification forming part of Letters Patent No. 145,149, dated December 2, 1873; reissue No. 5,773, dated February 24, 1874; application filed February 16, 1874.

*To all whom it may concern:*

Be it known that I, FREDERICK BURNEY, of Faversham, in the county of Kent and Kingdom of Great Britain, have invented an Improved Process of Manufacturing Gunpowder formed into regular grains of large size, known as "pebble" gunpowder, and implements for the manufacture of the same, of which the following is a specification:

This invention relates, first, to a process of manufacturing pebble gunpowder, being gunpowder formed into grains of large size; and, second, to plate molds for forming said grains.

According to my invention, I mold the meal or broken-down mill-cake received from the amalgamating-mill into pebble powder at one operation, the powder being formed into "grains" of a uniform size and shape. For this purpose I compress a layer of broken-down mill-cake between plates or molds, worked by hydraulic or other pressure, by which the meal or broken-down mill-cake is condensed into uniform grains of the desired size. The plates forming each half of the mold are made precisely alike, each being formed with a number of cells or recesses of uniform shape and size. These cells are made angular in form, with inclined sides, to facilitate the removal of the compressed powder. The cells cover the whole surface of the plate or mold, without any intervening flat surface, so that the whole of the pressure is exerted on the powder in the cells. In molding, the cells of the two plates are made to coincide, one-half of the grain into which the powder or mill-cake supplied to the mold is pressed being formed by each plate. By this means grains are made of angular form, (octahedrons, for instance,) each cell in the plate forming one-half of the figure produced.

Figure 1:
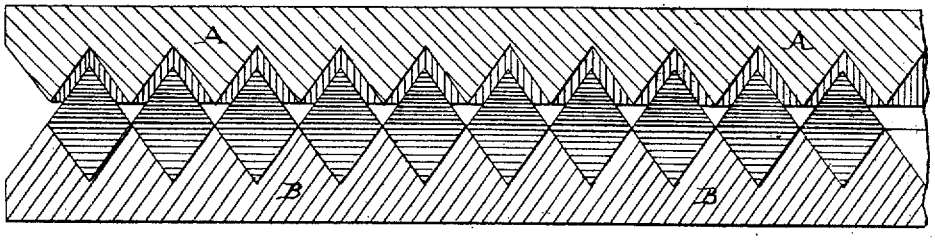
Figure 2:
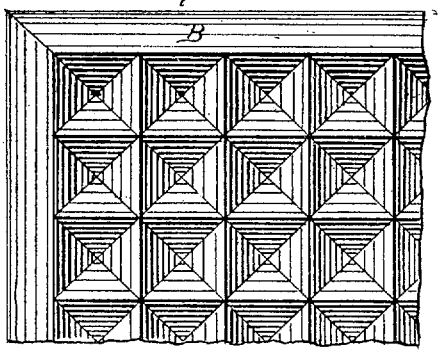
Figure 3:
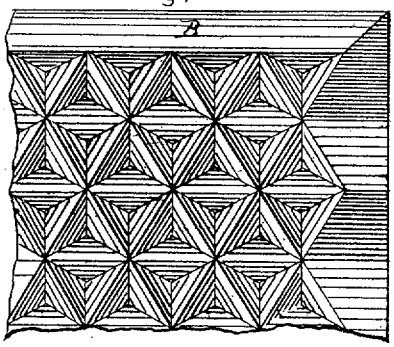
Figure 4:
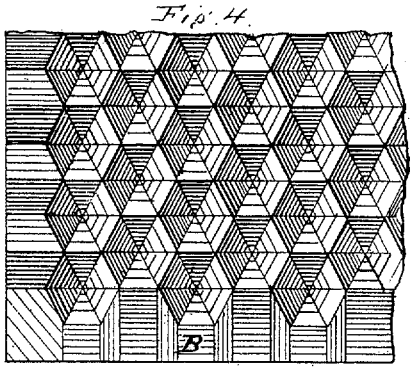
Figure 5:
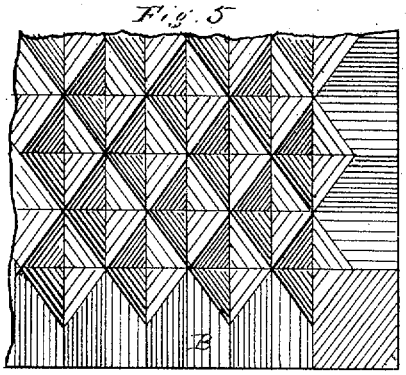

Figure 1 shows a transverse section of a portion of a pair of the mold-plates separated after having compressed the powder placed between them into grains or pebbles, which are shown as remaining in the cells of the lower plate. Fig. 2 is a plan, showing the cellular or honey-combed surface in which the powder is molded, the surfaces of the two plates being precisely alike. Figs. 3, 4, and 5 are plan views of mold-plates with cells of different forms. Figs. 6, 7, 8, and 9 are views of separate grains of powder formed in said molds, respectively.

Figure 6:
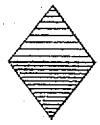
Figure 8:
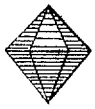
Figure 7:
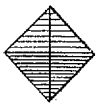
Figure 9:
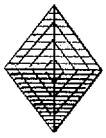

A and B are the upper and lower mold-plates, respectively. They are mounted in a hydraulic press, (not shown,) the upper plate, A, being fixed by clamps around its beveled edges, bolted to the head or top of the press-frame, and the lower plate, B, supported on the follower of the press, but without being fixed thereto, in a position exactly parallel with the upper plate, A. The cellular surfaces of the two molds or plates face one another, and studs or pins are fixed on the follower for the plate B to abut against when in position, and so make the cells in the two plates coincide exactly when brought together. The plates are of metal, (preferably gun-metal,) or may be of any other suitable material or composition having sufficient strength and smoothness, and are formed by casting in molds or otherwise, each with cells or molds of uniform shape and size covering one surface. These cells, whether square in plan, as shown in Fig. 2, or of triangular, diamond, or hexagonal form, as shown in Figs. 3, 4, and 5, are so disposed close together that the whole surface of the plate is occupied, the inclined sides of contiguous cells meeting one another at an angle, without any intervening flat surface between the cells or around the edges, the plates presenting the appearance of a honey-comb. The sides of the cells are inclined, to facilitate the removal of the compressed powder, and meet in an apex at the center. The cells may, however, be slightly filled in, to round off or flatten the apex of the grain or pebble, as sharp angles are liable to be abraded in packing. When the cells are made in the shape shown in Fig. 2, the grain or pebble of compressed powder will be in the form of an octahedron, as shown in Figs. 1 and 6, the grains formed by plates having cells, as in Figs. 3, 4, and 5, being shown in Figs. 7, 8, and 9, respectively.

The operation is as follows: A supply of meal or broken-down mill-cake is placed on the lower or movable plate B in a uniform layer of suitable depth, according to the degree of density required. The said plate B is then placed in position on the follower of the press, and, the two plates being then brought close together by the motion of the follower, pressure is exerted on the whole layer of the mill-cake, which is compressed in the cells into the form of grains, one-half of every grain being formed in each plate. The plates are then caused to recede, and, the plate B being withdrawn from the press, the compressed grains which remain thereon may be removed. As the plates do not actually meet, the grains or pebbles will be slightly connected at the edges; but they may be easily separated by hand, and are then ready to be glazed, as usual. Several pairs of mold-plates, each pair having a layer of mill-cake between them, may be superposed on the press-follower, and simultaneously compressed at one stroke of the press, the plates being held in position and guided by the pillars or frame-work of the press.

I am aware that pebble gunpowder has been manufactured by pressing meal powder into cylindrical holes in a mold-slab by means of cylindrical plugs forced into said holes, thus forming short cylindrical pellets or pebbles; but it is manifest that this is a very slow and defective process, inasmuch as only so many pellets or pebbles can be made at one operation of the press as can be contained in one mold-slab, while by my process numerous pairs of cellular plates may be superimposed one above another, and pressed by a single operation.

Having thus fully described my invention, and the mode of carrying it into effect, what I claim as my invention, and desire to secure by Letters Patent, is—

1. The process herein described of molding meal gunpowder or broken-down mill-cake into regular pebbles or grains of large size at one operation by pressure between plates having cellular surfaces, substantially as described.

2. Mold-plates with cellular surfaces, the cells being shaped and arranged substantially as hereinbefore described, and for the purpose specified.

FREDERICK BURNEY.

Witnesses:

THOS. R. LONGLEY,
30 *Court Street, Faversham, Kent.*

J. B. WYNN,
24 *Royal Exchange, London.*